United States Patent
Alfaro et al.

(10) Patent No.: US 10,917,899 B1
(45) Date of Patent: Feb. 9, 2021

(54) METHOD AND APPARATUS TO MAXIMIZE SIMULTANEOUS MODEM OPERATIONS IN A CONVERGED COMMUNICATION DEVICE

(71) Applicant: MOTOROLA SOLUTIONS, INC., Chicago, IL (US)

(72) Inventors: Javier Alfaro, Miami, FL (US); Dennis A Byk, Ft. Lauderdale, FL (US); Mark A Boerger, Plantation, FL (US); Mark Antilla, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 51 days.

(21) Appl. No.: 16/525,864

(22) Filed: Jul. 30, 2019

(51) Int. Cl.
*H04W 72/08* (2009.01)
*H04W 74/08* (2009.01)
*H04W 84/04* (2009.01)
*H04W 88/06* (2009.01)

(52) U.S. Cl.
CPC ..... *H04W 72/082* (2013.01); *H04W 74/0816* (2013.01); *H04W 84/042* (2013.01); *H04W 88/06* (2013.01)

(58) Field of Classification Search
CPC .............................................. H04N 21/42676
See application file for complete search history.

(56) References Cited

U.S. PATENT DOCUMENTS

| | | | |
|---|---|---|---|
| 6,643,522 B1 | 11/2003 | Young | |
| 7,197,291 B2 | 3/2007 | Mach et al. | |
| 8,712,331 B2 | 4/2014 | Makhlouf et al. | |
| 8,923,816 B2 * | 12/2014 | Lee | H04W 12/06 455/411 |
| 8,995,918 B2 | 3/2015 | Scribano et al. | |
| 9,008,020 B2 | 4/2015 | Yacobi et al. | |
| 9,066,363 B2 | 6/2015 | Anderson et al. | |
| 9,231,711 B2 | 1/2016 | Ericson | |
| 9,247,413 B1 | 1/2016 | Sahoo et al. | |
| 9,277,564 B2 * | 3/2016 | Wang | H04W 72/04 |
| 9,313,013 B2 | 4/2016 | Scribano et al. | |
| 9,363,845 B1 | 6/2016 | Sahoo et al. | |
| 9,433,012 B2 | 8/2016 | Gruet et al. | |
| 9,461,696 B1 | 10/2016 | Baker et al. | |
| 9,504,058 B2 | 11/2016 | Shperling et al. | |

(Continued)

FOREIGN PATENT DOCUMENTS

| | | |
|---|---|---|
| CN | 108183725 A | 6/2018 |
| GB | 2489702 A | 10/2012 |

OTHER PUBLICATIONS

Boerger, Mark. A et al.: "Method and Apparatus for Managing Power-Up of a Portable Communication Device," U.S. Appl. No. 16/392,168, filed Apr. 23, 2019, all pages.

(Continued)

*Primary Examiner* — Jamaal Henson
(74) *Attorney, Agent, or Firm* — Barbara R. Doutre

(57) ABSTRACT

A portable communication device provides improved converged operations through the use of a programmable logic array operating as a coexistence module (CEM) interoperating with different processors, different modems, and an attenuation switch. Interference during converged operation is detected, analyzed, and applicable mitigation is applied, thereby enabling converged communications to be established in a mitigated mode until the interference has been removed.

21 Claims, 2 Drawing Sheets

(56) References Cited

U.S. PATENT DOCUMENTS

| | | | |
|---|---|---|---|
| 9,615,299 B1 | 4/2017 | Bercovici et al. | |
| 9,642,154 B2 | 5/2017 | Makhlouf et al. | |
| 9,668,300 B2 | 5/2017 | Anderson et al. | |
| 9,749,263 B2 | 8/2017 | Jin et al. | |
| 9,979,069 B2 | 5/2018 | Faraone et al. | |
| 10,034,202 B2* | 7/2018 | Hsu | H04W 8/18 |
| 10,039,041 B2 | 7/2018 | Bercovici et al. | |
| 10,135,139 B2 | 11/2018 | Contreras et al. | |
| 10,264,587 B2 | 4/2019 | Hiben et al. | |
| 10,334,473 B2 | 6/2019 | Bercovici et al. | |
| 10,834,649 B2* | 11/2020 | Roeland | H04W 36/30 |
| 2009/0245221 A1* | 10/2009 | Piipponen | H04W 88/06 |
| | | | 370/343 |
| 2009/0274202 A1* | 11/2009 | Hanke | H04W 88/06 |
| | | | 375/220 |
| 2011/0105037 A1* | 5/2011 | Narasimha | H04B 1/525 |
| | | | 455/63.1 |
| 2013/0183904 A1 | 7/2013 | Hiben et al. | |
| 2013/0272436 A1* | 10/2013 | Makhlouf | H04L 1/0025 |
| | | | 375/260 |
| 2014/0135061 A1* | 5/2014 | Rousu | H04B 1/18 |
| | | | 455/553.1 |
| 2014/0301493 A1* | 10/2014 | Govindswamy | H04B 7/0817 |
| | | | 375/267 |
| 2015/0148088 A1 | 5/2015 | Ericson | |
| 2015/0163752 A1* | 6/2015 | Appleton | H04W 52/243 |
| | | | 370/252 |
| 2016/0088543 A1 | 3/2016 | Zhao et al. | |
| 2016/0095154 A1* | 3/2016 | Palm | H04W 48/18 |
| | | | 370/329 |
| 2016/0127964 A1* | 5/2016 | Roeland | H04W 36/14 |
| | | | 370/332 |
| 2016/0255531 A1* | 9/2016 | Stein | H04L 63/18 |
| | | | 455/575.1 |
| 2016/0380665 A1* | 12/2016 | Lee | H04W 36/14 |
| | | | 455/552.1 |
| 2017/0099676 A1* | 4/2017 | Bartels | H04W 72/1268 |
| 2019/0052302 A1* | 2/2019 | Lee | H04B 1/18 |
| 2019/0215765 A1 | 7/2019 | Ramasamy et al. | |

OTHER PUBLICATIONS

Farone et al.: "Antenna System for a Portable Communication Device", U.S. Appl. No. 16/393,890, filed Apr. 24, 2019, all pages.
The International Search Report and the Written Opinion corresponding patent application serial No. PCT/US2020/042242 filed Jul. 16, 2020, dated Nov. 4, 2020, all pages.

* cited by examiner

METHOD AND APPARATUS TO MAXIMIZE SIMULTANEOUS MODEM OPERATIONS IN A CONVERGED COMMUNICATION DEVICE

FIELD OF THE INVENTION

This application pertains to portable communication devices and more particularly to managing modem operations of a converged portable communication device.

BACKGROUND OF THE INVENTION

Portable battery powered communication devices are often utilized in public safety environments, such as law enforcement, fire rescue, and the like. There is an increased desire to expand the functionality of public safety communication devices to incorporate additional features that run on different operating platforms, other than the main mission critical public safety platform. Such devices may be referred to as converged devices. It is highly desirable that a converged device be able to operate two modems simultaneously. However, operating two modems simultaneously can result in plethora of complex self-interference scenarios not encountered in conventional single modem devices. For example, out-of-band emissions, blocking and/or intermediation occurring in one sub-system of a converged device may severely interfere with the performance of another sub-system of the converged device. Compliance with regulatory emission limits may also lead to inter-modulation artifacts from one modem interference with nearby spectrum of another modem.

Existing strategies to interference mitigation, such as those used on single modem devices, do not lend themselves well to converged devices, as these strategies tend to negatively impact performance and timing of one or more sub-systems.

Hence, there is a need for an improved interference mitigation approach in a converged portable communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
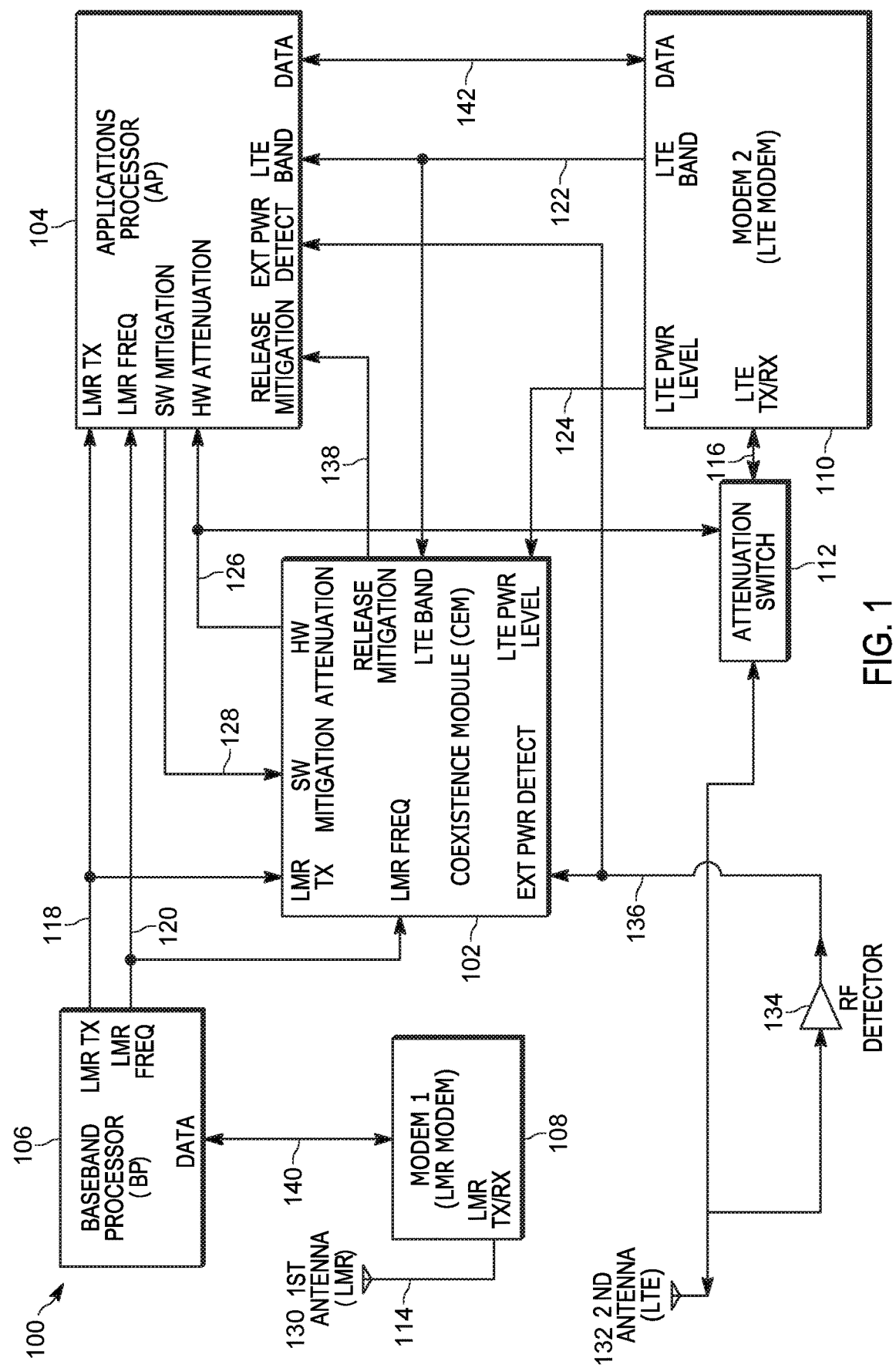
FIG. 1 is a block diagram of a portable communication device formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an apparatus and method for dynamically managing simultaneous modem operation in a portable communication device. The embodiments are directed to mitigating interference resulting from the simultaneous operation of the two or more modems. Improved converged communications is provided through the use of a programmable logic array operating as a coexistence module (CEM) interoperating with a plurality of different processors, a plurality of different modems, and a plurality of attenuation switches. Interference during converged operation is detected, analyzed, and applicable mitigation is applied to the interference, thereby enabling converged communications to be established in a mitigated mode. The mitigated mode of operation continues until the interference has been removed. Mission critical communications is maintained without relying on the use of infrastructure collaboration.

FIG. 1 is a block diagram of a portable communication device 100 formed and operating in accordance with some embodiments. The portable communication device 100 is powered by a battery (not shown). The portable communication device 100 comprises a programmable logic array operating as a coexistence module (CEM) 102, an applications processor (AP) 104 operatively coupled to the CEM 102, and a baseband processor (BP) 106 operatively coupled to the CEM and the AP. The portable communication device 100 further comprise a first modem 108, such as a land mobile radio (LMR) modem, operatively coupled to the BP 106, the first modem operating using a first frequency band of operation. The first modem is responsible for mission critical operations, such as scan, push-to-talk (PTT), and high power audio. The portable communication device 100 further comprises a second modem 110, such as a long term evolution (LTE) modem, operatively coupled to the AP 104, the second modem operating using a second frequency band of operation. The AP 104 is responsible for non-mission critical operations, such as software applications associated with touchscreen interface, low power audio, and global positioning system (GPS). Other radio elements such as radio frequency (RF) transmitters, receivers, power amplifiers are not shown (to maintain simplicity) but are understood to be embodied within the device 100.

In accordance with some embodiments, the AP 104, the BP 106, and the first and second modems 108, 110 are operable in a converged mode in which both the first and second modems operate simultaneously receiving and transmitting signals via respective first and second antennas 130, 132, such as an LMR antenna and an LTE antenna. Data 140 is transferred between the baseband processor 106 and the first modem 108 and then via the LMR TX/RX 114 onto the first antenna 130. For example, narrowband data is transferred between the BP and the LMR modem and then to the LMR antenna. Data 142 is also transferred between the applications processor 104 and the second modem 110 and then via the LTE TX/RX 116 onto the second antenna 132, For example broadband data is transferred between the AP and the LIE modem and then to the LIE antenna.

In accordance with the embodiments, the portable communication device 100 further comprises an attenuation switch 112 operatively coupled to the CEM 102 and to the second modem 110. The attenuation switch 112 operates as a hardware clamp to second modem communications. The attenuation switch 112 is disengaged during normal, non-interfered converged operation. During engagement of the attenuation switch 112, incoming RF signals to the second (LTE) antenna 132 are disconnected, thereby preventing external RF energy from damaging the second modem 110. Protection is also provided from internal RF energy generated from the first modem (LMR internal). Additionally, outgoing RF signals from the second modem 110 via the LTE TX/RX signal 116 are also disconnected, thereby preventing RF Energy from the second modem 110 from interfering with the first modem 108. The methods employed by the attenuation switch 112 may be one of shunting the antenna path to ground, or providing an open circuit between the antenna path and the second modem. The attenuation switch 112 may also be realized as a plurality of switches each acting on a plurality of paths to the second modem 110 and a plurality of second antennas 132.

During converged operation, the BP 106 further generates indicator signals 118, 120 to the CEM 102 and to the AP 104 while the first modem 108 is transmitting and receiving on a first frequency band. Simultaneously, the second modem 110 is generating indicator signals 122 to the CEM 102 and the AP 104 while transmitting and receiving on the second frequency band. For example, the BP 106 may generate the indicator signal 118 indicative of 'LMR transmit enabled' to the CEM 102 and to the AP 104. The BP 106 may also generate the indicator signal 120 indicative of frequency band, such as 'LMR frequency', to the CEM 102 and to the AP 104. The 'LMR Frequency' may specify the exact LMR Frequency in use or a range of LMR frequencies that are currently in use. In simultaneous operations, the second modem 110 generates the indicator signal 122 to the CEM 102 and the AP 104 indicative of the frequency band of operation, such as 'LTE band'. 'The LTE' band' may specify the exact LTE frequency in use, or a range of LIE Frequencies in use, for example Band14 or Band5.

In accordance with some embodiments, the indicator signals 118, 120, 122 are analyzed by the CEM 102 and the AP 104 for interference. In response to detecting interference by the CEM 102, the CEM drives a hardware attenuation enable line 126 to both the AP 104 and the attenuation switch 112, thereby engaging the attenuation switch 112 which serves to disconnect the second modem 110 from the second antenna 132. In response to the hardware attenuation enable line 126 being enabled, the AP 104 performs additional analysis to confirm the interference detected by the CEM 102. In some embodiments, a change in the indicator signals 118,120, 122 will trigger this interference analysis. The AP 104 then determines and performs an appropriate interference mitigation. This mitigation will be performed after an optional holdoff timer stage. The holdoff timer may be a configurable holdoff timer. The AP validates that the interference is still present before applying the interference mitigation. An example scenario would be during LMR scan, in which the time spent in the interference scenario would be shorter than the time required to engage the software mitigation. In some embodiments, where the AP determines that software mitigation is the appropriate interference mitigation, the AP 104 then drives the software mitigation line 128 to the CEM 102. In other embodiments, where AP 104 determines that power mitigation is the appropriate interference mitigation, the AP 104 then instructs the second modem 110 to perform a specific power level interference mitigation, and the second modem 110 then drives a TX Power Level line 124 to the CEM 102. In response to either the TX power level signal 124 or software mitigation signal 128, the CEM 102 then releases the hardware attenuation enabled line 126 thereby releasing the attenuation switch 112 in response to the interference software mitigation being engaged.

The CEM 102 further detects changes in interference conditions, such as via the indicator signals 118, 120, 122 and instructs the AP 104 to disengage the interference mitigation, via a release mitigation signal 138, when the interference is no longer present. In some embodiments, a change in the indicator signals 118,120, 122 will trigger the AP to reevaluate if the interference is no longer present. Prior to removing the mitigation, the AP may apply a second holdoff timer to prevent mitigation thrashing scenarios that may occur with LMR scan or trunking mobility. At the completion of the second holdoff timer, the AP will remove the mitigation, thereby returning the first and second modems 108, 110 to normal converged operation. For example, interference mitigation can be removed in response to a frequency change by one of the modems which negates the need for the interference mitigation.

In accordance with the embodiments, the interference mitigation may comprise one or more of: power reduction to the second modem; data throttling to the second modem; and/or band steering of the second modem. For example, for the LMR/LTE application, the interference mitigation may comprise one or more of: power reduction to the LTE modem, reducing data speed to the LTE modem, and/or band steering of the LTE modem. The band steering may be performed for example, through dynamically disabling certain LIE bands to steer the LIE modem to a non-interfering location.

While examples are provided which refer to LMR and LTE modems, it is to be appreciated that the embodiments can be applied beyond LMR and LTE operations. The use of the baseband processor 106 and the LMR modem 108 is particularly advantageous to public safety communication devices which support mission critical communications. Such devices rely on mission critical push-to-talk (PTT) and scan, hence the mitigation of interference from the LTE modem 110 is extremely important. The applications processor 104 and the LTE modem 110 provide a plurality of non-mission critical features such as text-to-speech, touch screen display features, BLUETOOTH, WiFi, and/or global positioning system (GPS) to name a few.

The portable communication device 100, when operating using first and second frequency bands controlled by first and second modems is able to detect and mitigate interference generated by second modem transmit frequency bands conflicting with first modem receive bands, external RF transmissions interfering with the second modem, internal first modem transmissions interfering with the second modem, and second modem transmit frequency bands interfering with internally generated first modem transmissions. For example, the portable communication device 100, when operating using LMR and LTE frequency bands controlled by LMR and LTE modems is able to detect and mitigate interference generated by: LTE transmit frequency bands conflicting with LMR receive bands, external LMR transmissions interfering with the LTE modem, internal LMR transmissions interfering with LTE modem, and LTE transmit frequency bands interfering with internally generated LMR transmissions.

To address the LTE transmit frequency bands conflicting with LMR receive bands and to address the LTE transmit frequency bands interfering with internally generated LMR transmissions, the mitigation approach comprises reducing power, and/or band steering, and/or reducing data speed to the second modem in the manner described previously.

Examples of potential interference may include but are not limited to, the upper edge of LMR 700 MHz band (769 MHz-775 MHz) which may be very close to the lower edge of LTE BAND 13 (Uplink 777 MHz-787 MHz) resulting in out of band emissions interference when two transceivers are operating simultaneously. Another example, in which frequencies overlap are LMR 800 MHz band (862 MHz-869 MHz) and LIE BAND 5 (Downlink 869 MHz-894 MHz). The hardware mitigation provided by the CEM 102 to engage the attenuation switch 112 provides instantaneous interference protection while the software mitigation is executed. These software mitigations can take hundreds of milliseconds to enact, and relying on them without the hardware mitigation would result in degraded LMR scan and mobility operations.

To address internal or external LMR transmissions interfering with the LTE modem, the portable communication device 100 further comprises a radio frequency (RF) detector 134 operatively coupled to a receive input of the second antenna 132 for detecting unwanted RF signals associated with a specific LMR frequency range that can interfere with or cause damage to the LIE modem 110. Although not shown, the RF detector 134 may interoperate with RF filtering and voltage reference circuits known in the field of RF detection. In the past, the presence of a strong unwanted RF signal to the second antenna 132 could have damaged t second modem 110 and/or cause interference to the second modem HO. For example, the presence of a strong unwanted external RF signal or internal inter-modulation artifacts being picked up by the second antenna 132 could have damaged the second modem 110 and/or cause interference to the second modem 110. The RF detector 134, in response to a strong unwanted signal, generates an external power detect signal 136 to the CEM 102 and to the AP 104. The CEM 102, in response to the external power detect signal 136, drives the hardware attenuation signal 126 thereby enabling the attenuation switch 112 and disconnecting the LIE antenna from the LTE modem thereby protecting the second modem 110 from damage or interference. The switch 112 remains engaged until the external power detect signal 136 changes to an acceptable level as determined by the CEM 102, thereby ensuring that the second modem 110 remains undamaged. For example, the presence of, a strong LMR signal at an LTE antenna is prevented from causing damage to the LTE modem by having the CEM maintain the attenuation switch engaged.

The coexistence module (CEM) 102 provided by the embodiments takes into account the currently active first and second modems and automatically applies respective mitigation only as needed under the predetermined scenarios of concern. Portable communication device 100 advantageously allows for fine adjustment of predetermined modem transceiver parameters such as power level and band operation. Implementation of the CEM 102 and attenuation switch 112 in hardware advantageously avoids substantial delays that would be experienced through a software only mitigation approach. In many cases, the dynamically changing nature of the communications protocol makes a software implementation impractical or unrealizable.

Figure 2:
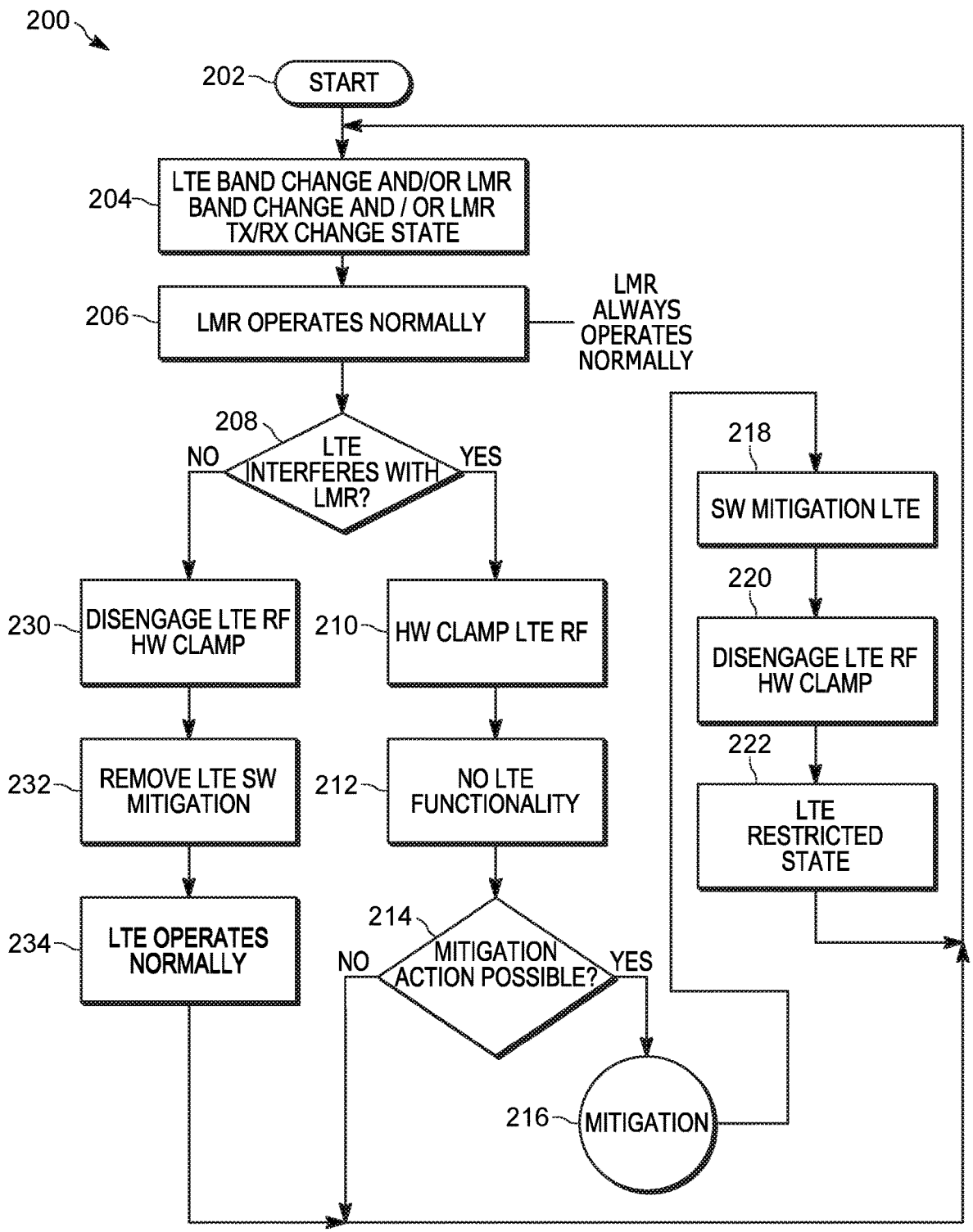
FIG. 2 is a flowchart of a method for managing simultaneous modem operations in a converged portable communication device in accordance with some embodiments.

FIG. 2 is a flowchart of a method 200 for managing simultaneous modem operations in a portable communication device, such as the converged portable communication device 100 of FIG. 1, in accordance with some embodiments. The method 200 has been illustrated in terms of LMR and LTE frequency bands, controlled by separate modems for ease of description, however it is to be appreciated that the method 200 is applicable to other modems operating simultaneously in frequency bands susceptible to interference.

The method begins at 202, with simultaneous operation of first and second modems, such as first and second modems 108, 110, respectively operating on first and second frequency bands. For example, simultaneous LMR and LTE communications taking place using LMR and LTE modems 108, 110 respectively, in a coexistence mode of the portable communication device 100. When a change in frequency band operation takes place at 204, for example a change in either LTE band operation and/or LMR TX/RX and/or LMR band operation, the method ensures operation of the first frequency band communications (LMR band) remains normal. At 208, a check is made for detecting interference during the coexistence mode. For example, the method detects whether the LTE band operations have interfered with the LMR band operations.

When interference is detected at 208, the method 200 proceeds by engaging an attenuation switch 112 to the antenna path of the second modem at 210 to temporarily negate second frequency band communications at 212. For example, the attenuation switch 112 can be used to temporarily negate LTE communications, while the LMR modem which may be handling mission critical communications operates normally.

At 214, the cause of interference is analyzed, by the applications processor 104 and a determination is made as to whether a mitigation action is possible. For example, the cause of interference may be analyzed by the AP and CEM of FIG. 1 as previously described. When a mitigation action is possible at 214, the method 200 proceeds to a mitigation mode at 216. The mitigation may be a software controlled mitigation comprising for example, reduced power to the second modem and/or reduced data speed to the second modem (the LTE modem) as determined at 218. The software mitigation 218 may incorporate an optional holdoff timer as previously described to cater for LMR scan and mobility operations. When the applicable software mitigation has been completed at 218, the method 200 proceeds by disengaging the attenuation switch at 220 and establishing communications using the applicable software mitigation thereby re-establishing coexistence operations at 222. For example the LTE modem may operate at restricted power and/or speed while the LMR operations remain normal. Communications continue in the mitigated coexistence mode returning to 204 to await a frequency change or change in TX/RX state.

Returning back to 214, when the cause of interference is analyzed and a determination is made that a software mitigation action is not possible, the method 200 returns back to 204 to await a frequency change or change in LMR TX/RX state. Here, the first frequency band communication, such as the LMR communication, operates normally while the second frequency band communication, such as LTE communications, has been negated at 212.

Returning back to 208, when interference is no longer detected in the mitigated coexistence mode, the attenuation switch is disengaged at 230. The removal of software mitigation 232 may incorporate an optional holdoff timer as previously described to cater for LMR scan and mobility operations. Any previously applied software mitigation is removed at 232, thereby allowing the second frequency band operations, such as the LTE band communications, to return to normal, non-mitigated operation at 234, while returning to 204 to await changes in frequency change or change in LMR TX/RX state.

The method and apparatus provided herein have beneficially enabled coexistence by mitigating interference without infrastructure interaction. The method and apparatus advantageously allow for fine adjustment for specific transceiver parameters such as power level, data throttling, and band steering.

The mitigation approach advantageously focus on band edges and avoids the use of large filters that could result in increased insertion loss across the band, as well as the cost and size associated with such filters. Additionally, the mitigation approach avoids the use of a software-only approach that can take hundreds of milliseconds which would degrade LMR scan/mobility operations that can be on the order of 50 ms.

While the AP and BP have been described in terms of advantageously supporting converged operation of two different modems, for example the LMR modem and the LTE modem, it is also to be appreciated that the embodiments can be applied to communication devices having more than two processors supported more than two modems operating with nearby frequency bands that are susceptible to RF interference. As such the embodiments can be said to apply to a plurality of different modems supporting communication protocols operating over different but nearby frequency bands which are susceptible to interference with each other.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
   a programmable logic array operating as a coexistence module (CEM);
   an applications processor (AP) operatively coupled to the CEM;
   a baseband processor (BP) operatively coupled to the CEM;
   a first modem operatively coupled to the BP, the first modem operating using a first frequency band;

a second modem operatively coupled to the AP, the second modem operating using a second frequency band;

the AP, the BP, and the first and second modems operating in a converged mode in which both the first and second modems operate simultaneously;

an attenuation switch operatively coupled to the CEM and the second modem;

the BP generating signals to the CEM and to the AP while the first modem is transmitting and receiving on the first frequency band;

the second modem generating signals to the CEM and to the AP when the second modem is transmitting and receiving on the second frequency band; and the AP and the CEM detecting signals indicating interference between the first and second frequency bands, the CEM engaging the attenuation switch to temporarily disconnect an antenna path of the second modem while the AP determines an applicable interference mitigation to counter the interference, the AP applying the interference mitigation to enable the second modem to operate in a restricted mode; and the AP generating a disengage signal to the CEM, and the CEM disengaging the attenuation switch in response thereto, thereby re-establishing converged operation during which the first modem and second modems operate simultaneously, the second modem operating in the restricted mode.

2. The portable communication device of claim 1, wherein the CEM detects changes to the detected interference and instructs the AP to disengage the interference mitigation, thereby returning the first and second modems to regular converged operation.

3. The portable communication device of claim 1, wherein interference between the first and second frequency bands comprises one or more of:
second modem transmit frequency bands conflicting with first modem receive bands;
external RF energy interfering with the second modem;
internal first modem transmissions interfering with the second modem; and
second modem transmit frequency bands interfering with internally generated first modem transmissions.

4. The portable communication device of claim 3, wherein the interference mitigation comprises at least one of:
power reduction to the second modem;
data throttling to the second modem;
band steering of the second modem.

5. The portable communication device of claim 1, wherein the first frequency communication band is configurable frequency band.

6. The portable communication device of claim 1, further comprising:
a first antenna associated with the first modem; and
a second antenna associated with the second modem;
an RF detector operatively coupled between the second antenna, the second modem, and the CEM, the RF detector for detecting an RF energy associated with the first communication frequency band being present at the second antenna and exceeding a predetermined RF energy threshold; and
the CEM engaging the attenuation switch while detecting that the RF energy exceeds the predetermined RF energy threshold.

7. The portable communication device of claim 1, wherein the RF energy is caused by at least one of:

internal transmissions interfering with the second modem;
external transmission interfering with the second modem.

8. The portable communication device of claim 1, wherein the first and second modems support communication protocols operating over frequency bands which are susceptible to interference with each other.

9. The portable communication device of claim 1, wherein the first modem is a land mobile radio (LMR) modem and the second modem is a long term evolution (LTE) modem.

10. The portable communication device of claim 1, wherein the AP waits for a configurable holdoff timer to expire and validates that the interference is still present before applying the interference mitigation.

11. The portable communication device of claim 2, wherein the AP waits for a configurable holdoff timer to expire and validates that the interference is still not present before removing the interference mitigation.

12. A method for managing communications in a converged portable communication device, the method comprising:
simultaneously operating first and second modems over first and second frequency bands in a regular converged mode of operation of the portable communication device;
detecting RF interference during the converged mode of operation;
engaging an attenuation switch to the second modem to temporarily negate RF communications associated with the second modem;
determining a cause of interference as being one from a plurality of predetermined interference scenarios;
determining whether a mitigation action is applicable based on the determined cause of interference;
applying the mitigation action to establish a mitigated converged mode of operation;
disengaging the attenuation switch upon establishing the mitigated converged mode of operation; and
communicating using the mitigated converged mode of operation.

13. The method of claim 12, wherein applying the mitigation action comprises at least one of:
applying reduced power to the second modem;
applying data speed throttling to the second modem;
applying band steering of the second modem.

14. The method of claim 12, further comprising:
detecting removal of the RF interference; and
disengaging the interference mitigation, thereby returning the first and second modems to regular converged operation.

15. The method of claim 12, wherein the attenuation switch is controlled by:
a logic array operating as a coexistence module, the logic array being responsive to: a baseband processor associated with the first modem, an applications processor associated with the second modem, and an external power detect circuit.

16. The method of claim 12, wherein detecting RF interference comprises detecting at least one of:
transmit frequency bands of the second modem conflicting with receive bands of the first modem;
external RF energy interfering with the second modem;
internal first modem transmissions interfering with the second modem;
second modem transmit frequency bands interfering with internally generated first modem transmissions.

17. The method of claim 12, wherein applying the mitigation action further comprises:
waiting for a configurable holdoff timer to expire; and
validating that the interference is still present before applying the interference mitigation.

18. The method of 14, wherein detecting removal of the interference further comprises:
waiting for a configurable holdoff timer to expire; and
validating that the interference is still not present before disengaging the interference mitigation.

19. The method of claim 12, wherein the first modem is a land mobile radio (LMR) modem operating over an LMR frequency band, and the second modem in a long term evolution (LTE) modem operating over an LTE frequency band.

20. The method of claim 19, wherein the LMR modem remains fully operational during the mitigation.

21. A portable communication device, comprising:
a first processor and a first modem managing mission-critical communications;
a second processor and a second modem managing non-mission mission-critical communications;
a first antenna coupled to the first modem;
a second antenna coupled to the second modem;
a coexistence module (CEM) operatively coupled to the first and second processors and the second modem, the CEM detecting one of: interference conditions and non-interference conditions, while the first and second modems operate simultaneously during converged operations; and
an attenuation switch coupled between the second antenna and the second modem, the attenuation switch being under control of the CEM, the attenuation switch being disengaged during normal converged operation in response to non-interference conditions being detected by the CEM, and the attenuation switch being temporarily engaged in response to interference conditions being detected by the CEM, the attenuation switch being temporarily engaged until interference mitigation is applied or the interference has been removed.

\* \* \* \* \*